United States Patent
Inoko

(10) Patent No.: US 8,562,140 B2
(45) Date of Patent: Oct. 22, 2013

(54) ILLUMINATION OPTICAL SYSTEM AND IMAGE DISPLAY APPARATUS MAKING USE THEREOF

(75) Inventor: Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/243,434

(22) Filed: Sep. 23, 2011

(65) Prior Publication Data
US 2012/0075553 A1 Mar. 29, 2012

Related U.S. Application Data

(63) Continuation of application No. 12/463,324, filed on May 8, 2009, which is a continuation of application No. 11/249,943, filed on Oct. 12, 2005, now Pat. No. 7,575,328.

(30) Foreign Application Priority Data

Oct. 14, 2004 (JP) .................................. 2004-299788

(51) Int. Cl.
*G03B 21/14* (2006.01)
(52) U.S. Cl.
USPC ............................................................ 353/38

(58) Field of Classification Search
USPC ............ 353/20, 38; 359/483.01, 490.01, 642, 359/649
See application file for complete search history.

(56) References Cited

U.S. PATENT DOCUMENTS

| 4,733,944 A * | 3/1988 | Fahlen et al. .................. 359/624 |
| 2004/0174595 A1* | 9/2004 | Koide ............................ 359/484 |
| 2007/0085971 A1* | 4/2007 | Okuyama et al. ................ 353/20 |

* cited by examiner

*Primary Examiner* — Thanh Luu
*Assistant Examiner* — Danell L Owens
(74) *Attorney, Agent, or Firm* — Canon U.S.A., Inc., IP Division

(57) ABSTRACT

An illumination optical system for illuminating a surface with a light beam from a light source, in a first plane parallel with the optical axis, the light beam from the light source is split, and first light source images are formed in a first zone with the use of the thus split light beams; light beams from the first light source images being led to the surface, in a second plane parallel with the optical axis and perpendicular to the first plane, the light beam from the light source is split, and second light source images are formed in a second zone, with the use of the thus split light beams, light beams from the second light source images being led to the surface, where the width of the first zone in the first plane is greater than that of the second zone in the second plane.

6 Claims, 9 Drawing Sheets

SECOND SECTION
(A SECTION HAVING A SMALL ANGULAR DISTRIBUTION OF A BEAM INCIDENT UPON A PANEL SURFACE, ORTHOGONAL TO THE FIRST SECTION)

FIRST SECTION
(A SECTION HAVING A WIDE ANGULAR DISTRIBUTION OF A BEAM INCIDENT UPON A PANEL SURFACE)

SECOND SECTION
(A SECTION HAVING A SMALL ANGULAR DISTRIBUTION OF A BEAM INCIDENT UPON A PANEL SURFACE, ORTHOGONAL TO THE FIRST SECTION)

FIRST SECTION
(A SECTION HAVING A WIDE ANGULAR DISTRIBUTION
OF A BEAM INCIDENT UPON A PANEL SURFACE)

SECOND SECTION
(A SECTION HAVING A SMALL ANGULAR DISTRIBUTION
OF A BEAM INCIDENT UPON A PANEL SURFACE, ORTHOGONAL
TO THE FIRST SECTION)

FIRST SECTION
(A SECTION HAVING A WIDE ANGULAR DISTRIBUTION OF
A BEAM INCIDENT UPON A PANEL SURFACE)

SECOND SECTION
(A SECTION HAVING A SMALL ANGULAR DISTRIBUTION OF
A BEAM INCIDENT UPON A PANEL SURFACE , ORTHOGONAL
TO THE FIRST SECTION)

FIRST SECTION
(A SECTION HAVING A WIDE ANGULAR DISTRIBUTION OF A BEAM INCIDENT UPON A PANEL SURFACE)

SECOND SECTION
(A SECTION HAVING A SMALL ANGULAR DISTRIBUTION OF A BEAM INCIDENT UPON A PANEL SURFACE, ORTHOGONAL TO THE FIRST SECTION)

ILLUMINATION OPTICAL SYSTEM AND IMAGE DISPLAY APPARATUS MAKING USE THEREOF

CROSS-REFERENCE TO RELATED APPLICATIONS

This application is a continuation of U.S. patent application Ser. No. 12/463,324 filed May 8, 2009, which is a continuation of U.S. patent application Ser. No. 11/249,943 filed Oct. 12, 2005 and issued Aug. 18, 2009 as U.S. Pat. No. 7,575,328, which claims priority to Japanese Patent Application No. 2004-299788 filed Oct. 14, 2004, each of which is hereby incorporated by reference herein in its entirety.

BACKGROUND OF THE INVENTION

1. Field of the Invention

The present invention relates to an illumination optical system for illuminating a surface to be illuminated, and further, relates to an image display apparatus (a liquid crystal projector or the like) in which a surface (an image display element such as a liquid crystal panel) is illuminated with the use of the illumination optical system, and the light beam from the surface to be illuminated is projected onto a projection surface such as a screen.

2. Description of the Related Art

Public attention has been focused on a projector having such a configuration that the light beam which has been modulated by a liquid crystal light valve in accordance with image data, is enlarged and projected onto a screen or the like. In this configuration of the projector, it is important to display an image projected on the screen with uniform brightness over the entire screen.

A well-known illumination optical system in the above-mentioned projector, has a configuration as shown in, for example, FIG. 8. That is, a light beam emitted from a light source 101 is turned by a parabolic surface reflector 102 into a substantially parallel light beam, and is then output from the therefrom. This parallel light beam is split and focused by a fly-eye lens (a lens array in which micro spherical lenses are two-dimensionally arranged) 103. The respective split light beams are focused in the vicinity of a second fly-eye lens 104 so as to produce an image of the light source (a two-dimensional image of the light source). The micro lenses which constitute these fly-eye lenses 103, 104 have a rectangular shape which is similar to the shape of the liquid display panel, that is, the surface to be illuminated. The split light beams output from the second fly-eye lens are focused by a condenser lens 105, and are led through a color separation optical system 106 and the like, and accordingly, the plurality of split beams illuminates the liquid crystal panel 107 in superposition. It is noted that only essential components of the illumination optical system are shown in FIG. 8 in order to facilitate the explanation of the function of the illumination optical system.

However, the above-mentioned illumination optical system, in general has a tendency such that the higher the light available efficiency, the larger the angular distribution of the light beam, and accordingly, has caused a problem of deterioration of the image quality such as irregularity or lowering of contrast when an optical component which is sensitive to an angular characteristic is used in the illumination optical system, and in particular, when a color separation film (dichroic mirror, dichroic prism or the like) or a polarization separation film (polarized film splitter or the like) inclined to the optical axis of an illumination optical system is used in a color separation optical system.

In order to prevent the above-mentioned deterioration of the image quality, there has been used an asymmetric optical system including an optical element having a small angular distribution in a direction in which it is sensitive to the angular distribution but having a large angular distribution in a direction in which it is insensitive to the angular distribution, as disclosed in Japanese Patent Laid-Open No. H06-75200 or Japanese Patent Laid-Open No. 2004-45907.

The Japanese Patent Laid-Open No. H06-75200 discloses a configuration which can reduce uneven color by using a cylindrical lens array which is a one-dimensional array serving as an optical integrator and as well utilizing Koehler illumination in the bending direction of an element which is highly sensitive to a one-dimensional angle, such as a dichroic mirror.

Further, Japanese Patent Laid-Open No. 2004-45907 discloses a configuration which can restrain the angular distribution of the light beam in one cross-sectional direction by setting a stop at a pupil position in a direction in which an angular sensitivity of a thin film component is high, thereby it is possible to improve the contrast.

However, in the Japanese Patent Laid-Open No. H06-75200, no superposing illumination is made in a cross-section (Koehler illumination cross-section) in which a cylindrical lens array has not a refractive power, uniform illumination cannot be obtained at the light valve surface. Accordingly, a relatively flat distribution should be selectively used from a nonuniform illumination distribution, resulting in low light available efficiency. Further, since the light beam from the light source to the condenser lens has a small angular distribution, although an image quality deteriorating effect by the dichroic mirror located therebetween is reduced, image quality deterioration caused by an element having a high angular sensitivity, such as a liquid crystal panel or the dichroic mirror, located after the condenser lens is inevitable as the light beam is converged by the condenser lens just before the liquid crystal panel. Further, in the cross-section in which no superposing illumination is made, when the light source causes uneven brightness due to fluctuation (arc jump, deterioration or the like) of the light source, the illumination distribution of the light valve also varies, resulting in unevenness at a projected screen.

Further, in the Japanese Patent Laid-Open No. 2004-45907, superposing illumination is made in cross-sections in both direction, although the light source can hardly have an effect, extreme lowering of the light available efficiency is inevitable since the light beam is limited by a stop. There has been disclosed such a configuration that the principle point positions of a part of lenses (an optical system between the lens array and the panel), other than the stop, are different from each other between two cross-sections in order to cause angular distributions in the two cross-sections to be different from each other. However, in a method stated in the description of the embodiments (a principal point of a collimator lens is changed), the boundary of the illumination zone at the surface of the liquid crystal display panel is unclear, resulting in lowering of brightness or uneven illumination. Further, since the telecentric condition (the exit pupil is sufficiently far from the panel surface) becomes unsatisfactory, there has been raised such a problem that uneven contrast and uneven color would be caused.

SUMMARY OF THE INVENTION

The present invention is devised in view of problems as mentioned above, and accordingly an object of the present invention is to provide an illumination optical system which can reduce the angular distribution in a section where an arbitrary optical component has a sensitive angular distribution, and in which brightness is uniform on the light valve so as to substantially avoid effects caused by unevenness of the light source.

According to a first aspect of the present invention, there is provided an illumination optical system for illuminating a surface to be illuminated with a light beam from a light source, wherein the light beam from the light source is split in a first plane which is parallel to the optical axis of the illumination optical system, a plurality of first source images are formed in a first light source image zone with the use of the thus split light beams, and light beams from the plurality of first light source images are led to the surface to be illuminated, the light beam from the light source is split in a second plane which is parallel to the optical axis of the illumination optical system and which is perpendicular to the first plane, a plurality of second source images are formed in a second light source image zone with the use of the thus split light beams, and light beams from the plurality of second light source images are led to the surface to be illuminated, and the width of the first light source image zone in the first plane is larger than that of the second light source image zone in the second plane.

Further, according to a second aspect of the present invention, there is provided an illumination optical system for illuminating a surface to be illuminated with light from a light source through the intermediary of a polarization separation surface, in which a second plane which is parallel with a normal line to the polarization separation surface and the optical axis of the illumination optical system, and a first plane which is perpendicular to the second plane and which is parallel with the optical axis of the illumination optical system are defined, comprising: being arranged successively in the mentioned order from the light source, a first front side cylindrical lens array including a plurality of cylindrical lenses having refractive powers in the first plane, a first rear side cylindrical lens array including a plurality of cylindrical lenses having refractive powers in the first plane, a second front side cylindrical lens array including a plurality of cylindrical lenses having refractive powers in the second plane, and a second rear side cylindrical lens array including a plurality of cylindrical lenses having refractive power in the second plane.

Further, according to a third aspect of the present invention for illuminating a surface to be illuminated with light from a light source through the intermediary of a polarization separation surface, in which a second plane which is parallel with a normal line to the polarization separation surface and the optical axis of the illumination optical system, and a first plane which is perpendicular to the second plane and which is parallel with the optical axis of the illumination optical system are defined, there is provided an illumination optical system comprising:

a plurality of lenses having refractive powers in a first plane, arranged in the direction of the first plane, and a plurality of lenses having refractive powers in the direction of the second plane, and arranged in the direction of the second plane, wherein the number of lenses of the plurality of lenses arranged in the first plane is larger than in the second plane.

According to fourth aspect of the present invention there is provided an illumination optical system comprising:

a first optical element array including a plurality of optical elements having refractive powers in a first plane containing the optical axis, for splitting light from an optical source into a plurality of partial light beams, a second optical element array including a plurality of optical elements having refractive powers in the first plane, for transmitting the plurality of partial light beams onto a surface to be illuminated, a superposing optical element for superposing the plurality of partial light beams output from the second optical element array with one another on the surface to be illuminated, the arrangement of refractive powers in the first plane being different from that in the second plane which contains the optical axis and which is perpendicular to the first plane, and a compressing device for compressing the width, in the first plane, of the light beam from the light source.

Further, according to a fifth aspect of the present invention, there is provided an image display apparatus comprising:

at least one liquid crystal display element, and an illumination optical system according to the first aspect of the present invention, for illuminating the at least one liquid crystal display element with light from the optical source.

Further features of the present invention will become apparent from the following description of exemplary embodiments (with reference to the attached drawings).

DESCRIPTION OF THE EMBODIMENTS

Explanation will be made of embodiments of the present invention with reference to the accompanying drawings.

[First Embodiment]

Figure 1A:
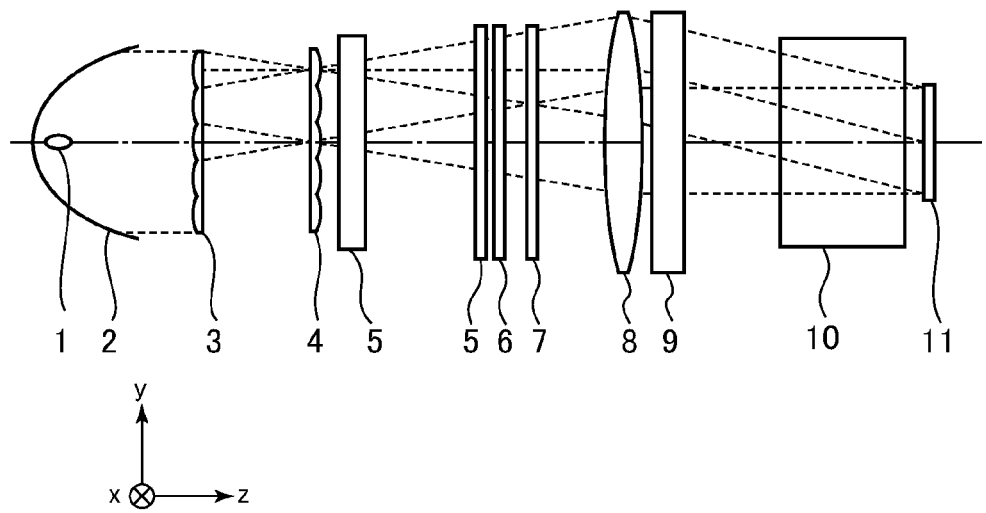
FIG. 1A is a sectional view illustrating an illumination optical system in a first embodiment of the present invention, in a first plane.
Figure 1B:
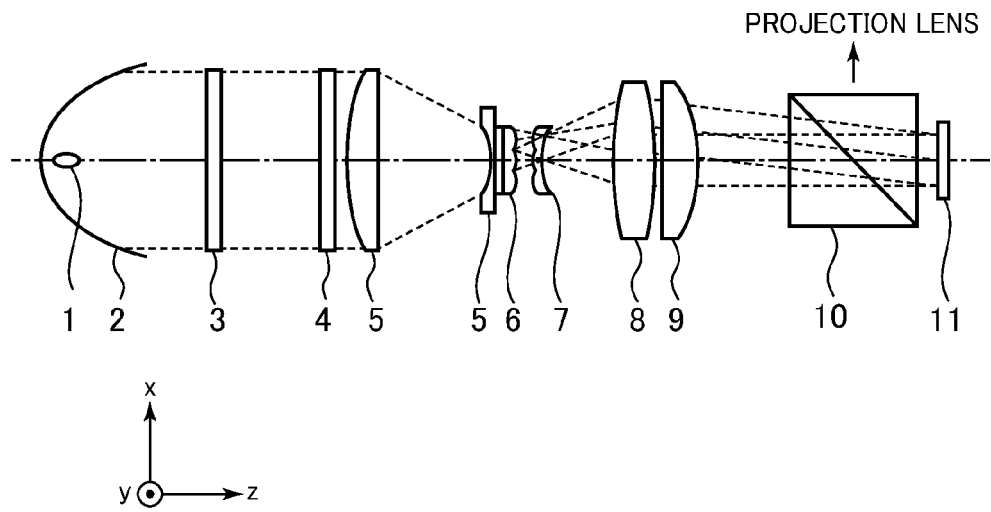
FIG. 1B is a sectional view illustrating the illumination optical system shown in FIG. 1A in a second plane.

Referring to FIGS. 1A and 1B which show the configuration of an illumination optical system in an embodiment of the present invention, the illumination optical system in the embodiment is used as an illumination optical system in a projector using a reflection type liquid crystal panel as an image display element (a transmission type liquid crystal pane can also be used).

It is noted here that the illumination optical system has the optical axis in the Z-axial direction. FIGS. 1A and 1B show a section in which the light beam incident upon a panel surface has a wide angular distribution (a first section or an YZ plane), and FIG. 1B shows a section in which the light beam has a narrow angular distribution (a second section or an XZ plane). Although these figures show only fundamental components of the projector optical system in order to simplify the explanation thereof, there can be of course used a configuration having a polarization converting element array in which polarization converting elements for converting unpolarized light into linearly polarized light are arrayed, a mirror for bending the optical path, an infrared cut-off filter, a polarizing plate and the like.

Figure 2:
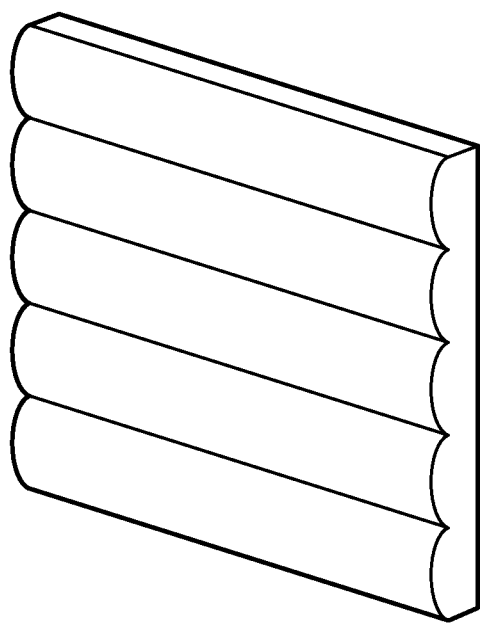
FIG. 2 is a perspective view illustrating a cylindrical lens array in the first embodiment of the present invention.

A light beam emitted from a light source (a light emitting part of a lamp) 1 omnidirectionally is turned by a parabolic reflector 2 into a substantially parallel light beam which is then output. This light beam is split by a first cylindrical lens array (which corresponds to an optical element array and which is shown in FIG. 2 in a perspective view) 3 into a plurality of partial light beams which are then converged. These split light beams are converged in the vicinity of a second cylindrical lens array 4 so as to form light source images (secondary light source images), respectively. In this embodiment, the light source images obtained by the action of the first cylindrical lens array as mentioned above are shown in FIG. 3A which shows the location of the light source images in a plane perpendicular to the optical axis and in which the first section can be shown as a straight line. In this case, W1 is the width of the zone where the light source images are formed, in the first section (inward direction). The width W1 of the light source image forming zone at positions where the light source images are formed, (the positions of the second cylindrical lenses having refractive powers in the first section in this embodiment or incident positions) is set to be maximum (or is the width obtained by cutting the zone by a section containing the optical axis) among widths of light source image zones which are obtained by cutting the light source image forming zone by various sections which are parallel with the first section. Incidentally, it is desirable as to the boundary for W1 to select the distance between two positions which are located endmost among positions where the brightness is ½ (which can changed to 1/10) of brightness of a point which is maximum within the light source image forming zone (It is of course possible to select the distance between two positions which are located endmost in the light source image forming zone or the distance between the brightness center of a band-like light source image located at one endmost side and the brightness center of a band-like light source image located the other endmost side). This matter is similar to W2 which will be described later.

Since these cylindrical lens arrays 3, 4 have refractive powers only in the first section, and accordingly, they do not substantially affect the light beam in the second section which is perpendicular to the first section. Meanwhile, an afocal optical system (a light beam compressing device which is in this case an optical system for emerging a parallel light beam while narrowing the diameter thereof) 5, a third cylindrical lens array 6, a fourth cylindrical lens array 7 and a cylindrical lens array 9 have no refractive powers in the first section. Accordingly, the split light beams output from the second cylindrical lens array 4 are converged by the condenser lens 8 without being affected in the first section by the above-mentioned optical elements which have refractive powers (optical powers) in only the second section, and then illuminate the reflection type liquid crystal panel 11 in a superposing manner by way of a color separation optical system 10 which is configured to have a polarized beam splitter positioned at an inclination to the optical axis of the illumination optical system (at an inclination so that the optical axes of the illumination optical system and the polarized beam splitter make therebetween an angle of 45 deg. or in a range from 42 to 48 deg.). it is of course also possible to use another configuration having a dichroic mirror or a dichroic prism. It is noted that the polarized beam splitter as stated above is an optical element which has a polarization separation characteristic (such a characteristic that light in one of polarizing directions is reflected by not less than 80% of light which is incident thereupon at a predetermined angle, but light in the other direction orthogonal to the one direction is transmitted by not less than 80%) for light at least in a part of the visible light region (which, in at least one exemplary embodiment, is at least not greater than 10 nm), and is not always necessary to be an optical element having a polarization separation characteristic for light in the entire visible light region.

Next, explanation will be made of the behavior (variation) of an optical beam in the second section. In the second section, the light beam which is output as substantially parallel light from the reflector 2 comes to the afocal optical system 5 without being affected by the first and second cylindrical lens arrays 3, 4. The afocal optical system 5 compresses the incident parallel light beam and outputs the light beam having a decreased beam diameter in the second section as again a parallel light beam. Although the afocal optical system 5 which is composed of a convex lens and a concave lens in combination is shown in FIG. 1B, it can be composed of convex lenses in combination whenever they can constitute a focal optical system. It is of course possible to have other than two lenses. Further, it can be considered that the afocal optical system can be composed of elements other than lenses. For example, the afocal optical system can be composed of an elliptic reflector and a concave (convex) lens in combination in such a case that the reflector 2 serves as a parabolic reflector (which outputs light from the light source as substantially parallel light) in the first section, but it serves as a so-called sculptured surface (rotationally asymmetrical surface) having the shape of an elliptic reflector (which outputs light from the light source as a converged light beam). Further, even though the reflector 2 has the shape of an ordinary elliptic reflector, if positions at which the converged light output therefrom is converted into parallel light are different from each other between the first section and the second section, the beam diameter in the first section and the beam diameter in the second section can be different from each other.

The parallel light beam output from the afocal optical system 5 and then converged is split by the third cylindrical lens array 6 into split light beams which are then focused in the vicinity of the fourth cylindrical lens array 7 so as to form the light source images. FIG. 3B shows the light source images which are formed by the third cylindrical lenses having refractive powers in the direction of the second section, in this embodiment. FIG. 3B shows the light source images in a plane perpendicular to the optical axis of the illumination optical system, and an example of the second section in FIG. 3B can be depicted by a straight line as in the second section (one example) shown in FIG. 3B. In this case, the width in the direction of this section is set to W2.

Figure 3A:
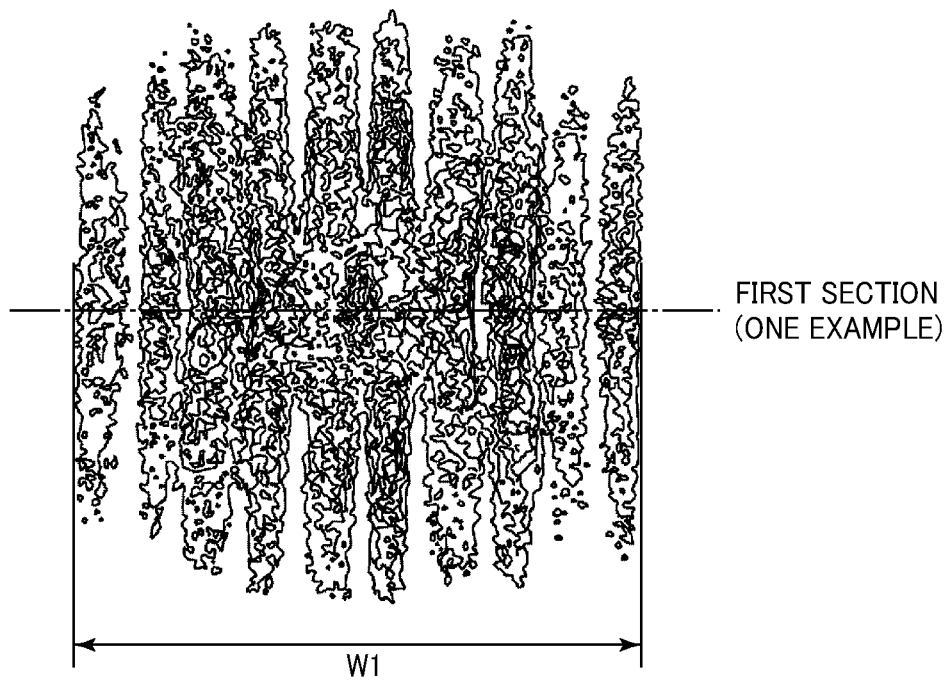
FIG. 3A is a sectional view illustrating the light source image formation zone in the first embodiment of the present invention, in the first plane.
Figure 3B:
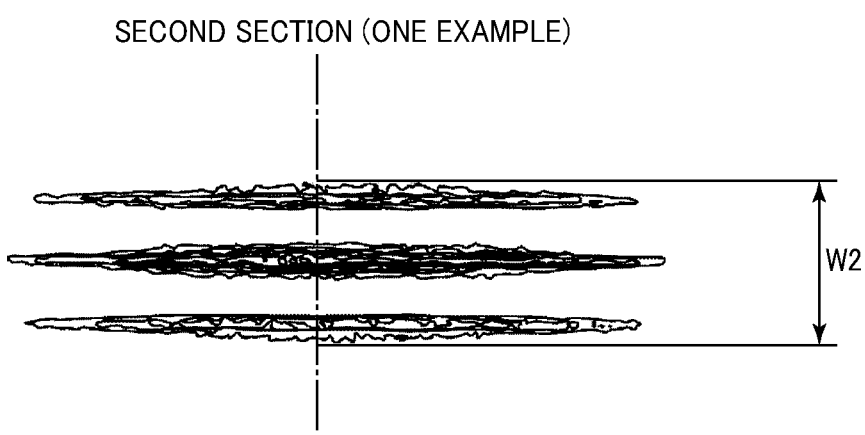
FIG. 3B is a second sectional view illustrating the light source image formation zone shown in FIG. 3A, in the second plane.
Figure 9A:
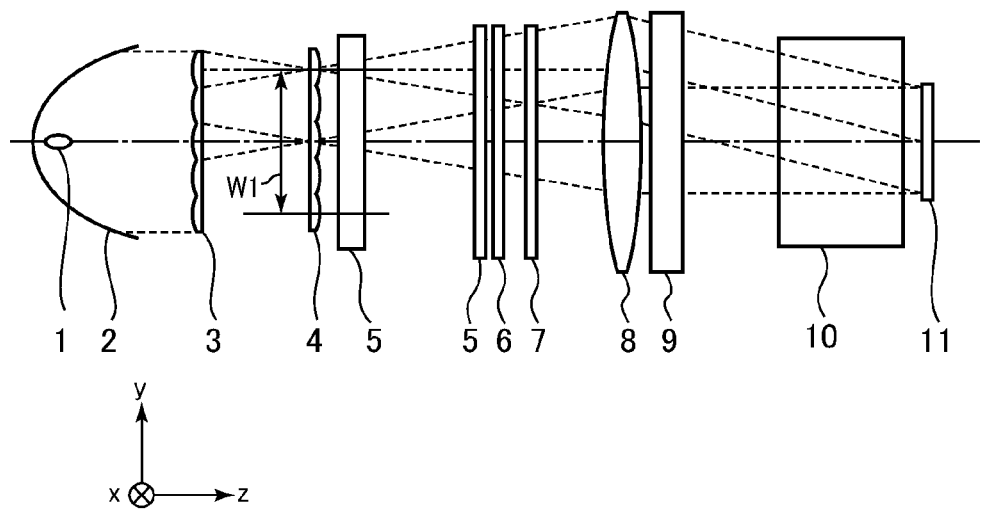
FIG. 9A is a view for explaining parameters W1', W2' in a first plane.
Figure 9B:
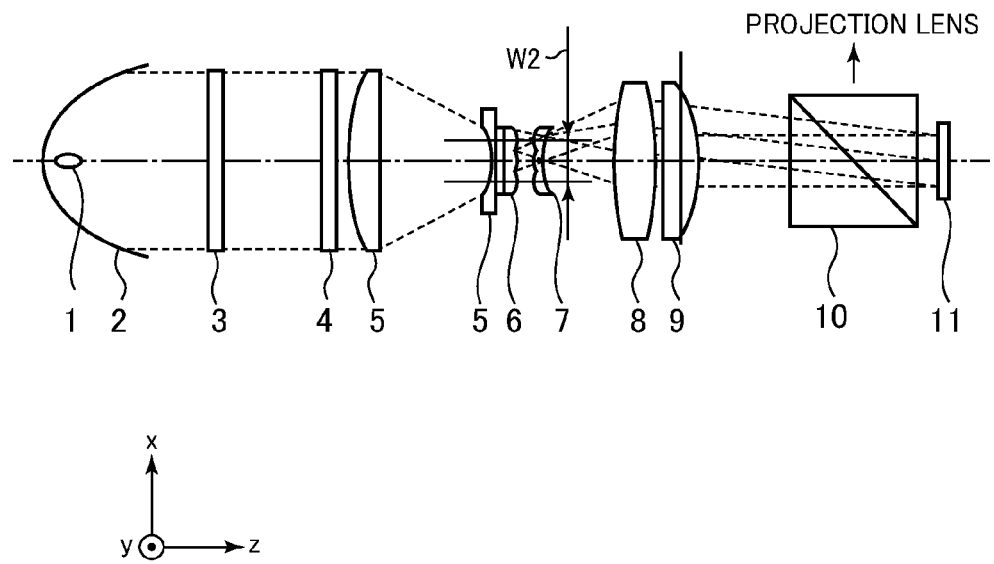
FIG. 9B is a view for explaining parameters W1', W2' in a second plane.

As understood by the comparison between FIGS. 3A and 3B, the width W2 of the light source image in the second section is narrower than the width W1 of the light source image in the first direction. The size relationship (ratio) between W1 and W2 can directly correspond to a size relationship (ratio) between angular distributions at the polarized beam splitter, and accordingly, the relationship therebetween is desirably set to W1>W2, that is, W2/W1, in at least one exemplary embodiment, can be less than 0.8 but greater than 0.1. and in yet another embodiment can be less than 0.6 but greater than 0.3. In view of the above-mentioned conditional formula, should the upper limit be exceeded, such an effect that the contrast is heightened may not be sufficiently obtained, and uneven brightness would be exhibited on the surface to be illuminated such as a liquid crystal display element without being satisfactorily improved. Moreover, should the lower limit be not exceeded to such an extent that the light beam split and converged by an arbitrary lens in the third cylindrical lens array 6 is not incident upon the corresponding cylindrical lens cell but is incident upon a different lens cell in the fourth cylindrical lens array 7 would be increased. The light beams which are not incident upon the corresponding lens cells come in part to positions out of an effective zone on the surface to be illuminated, and accordingly, they become ineffective. That is, the light available efficiency would be lowered. In the case of not exceeding the lower limit as stated above, the percentage of light which does not come to the surface to be illuminated is abruptly increased, and accordingly, the brightness obtained in a projector is greatly decreased. It is noted that W1 and W2 can be taken respectively as the beam diameter of the light beam which is incident upon the second cylindrical lens array, in the first section, and as the beam diameter of the light beam incident upon the fourth cylindrical lens array, in the second section. Further, as shown in FIGS. 9A and 9B, in such a case that the distance between the optical axis of a cylindrical lens at one end side of the second cylindrical lens array and the optical axis of a cylindrical lens at the other end side is set to W1' while the distance between the optical axis of a cylindrical lens at one end side of the fourth cylindrical lend array and the optical axis of a cylindrical lens at the other end side is set to W2', the relationship therebetween is desirably set to W1'>W2', that is, W2'/W1', in at least one exemplary embodiment, can be less than 0.8 but greater than 0.1. and in yet another embodiment can be less than 0.6 but greater than 0.3.

The split light beams output from the fourth cylindrical lens array 7 are converged by the condenser lens 8 and the cylindrical lens array 9 and illuminate the reflection type liquid crystal panel 11 in a superposing manner by way of the color separation optical system 10 having the polarized beam splitter and the like. The condenser lens 8 is a spherical lens having equal refractive powers in both first and second sections (It is of course possible to use two lenses one of which has a refractive power only in the first section and the other one of which has a refractive power only in the second section, instead of the condenser lens 8).

Referring to FIGS. 1A and 1B, it is required that the refractive powers for converging the split light beams are greater in the second section where the cylindrical lens array is located at a position nearer to the panel side than in the first section, and accordingly, refractive powers for the condensing lenses are increased by the cylindrical lens array 10. Cylindrical lenses can of course be added in the respective sections. Further, toroidal lenses having different refractive powers between the first and second surfaces can be used so as to exhibit similar effects. Further, although the fourth cylindrical lens array 8 has at its rear surface a negative refractive power which is required in such a case that the third and fourth cylindrical lens arrays 7, 8 have one and the same pitches, a similar function can be materialized by making cylindrical lenses in a cylindrical lens array to be eccentric or making the pitches of the cylindrical lens array to be different between the third cylindrical lens array and the fourth cylindrical lens arrays.

In this embodiment, although the beam diameter of the light beam output from the reflector is compressed not in the first section but in the second section so as to make the width of the light source image forming zone in the first section different from that in the second section, the present invention is not limited to this configuration. For example, the beam diameter can be compressed in both first and second sections, and as well the beam diameter can be compressed in one section but be enlarged in the other section while the beam diameter can be enlarged in both sections. An optical system having functions of compressing and enlarging the light beam in both first and second sections can not be used if the shape of the reflector is appropriate (the beam diameter of the light beam output from the reflector is different between the first section and the second section). If the width of the light source image forming zone is different between the first section and the second section, and if the width W2 of the light source image forming zone in a section which is sensitive to the angular distribution (a section which is parallel with both normal line to the polarization separation surface of the polarized beam splitter and optical axis of the illumination optical system, that is, the second section in this embodiment) and the width W1 of the light source image forming zone in a section which is perpendicular to the former section and which is insensitive to the angular distribution (that is, which is parallel with the optical axis of the illumination optical system) satisfy the above-mentioned condition, any configuration can be used.

With the configuration as stated above, as shown in FIGS. 1A and 1B, the angular distribution of the illumination light beam incident upon the reflection type liquid crystal panel (the surface to be illuminated) 11 in the second section is narrowed with respect to the first section (after passing through a final optical element having a refractive power in the illumination optical system). The polarized beam splitter located in the color separation optical system 10 which is arranged in front of the reflection type liquid crystal panel 11 is adapted to bend a part of the optical paths of the light beams in the second section. A general-purpose dielectric multi-film polarized light splitter carries out polarization separation with the use of the difference between P-polarization and S-polarization at a Brewster angle, the further the deviation of the light beam from the Brewster angle, the more insufficient the polarization separation. Accordingly, should an illumination optical system having a wide angular distribution be used, polarized light to be transmitted would be reflected or polarized light to be reflected would be transmitted. Thus, light (leakage light) having a polarized state different from a desired polarized light would be incident upon the liquid crystal panel, resulting in lowering of the contrast. However, in the illumination optical system in this embodiment, since the angular distribution in a section which is sensitive to the angular distribution is set to be smaller than the angular distribution in a section which is insensitive to the angular distribution, the degree of generation of leakage light in a section which is sensitive to the angular distribution can be restrained, thereby it is possible to obtain an image having a high contrast.

Further, W1 and W2 as stated above can be substituted as follows so as to satisfy the above-mentioned conditional formula. In an illumination optical system comprising a first cylindrical lens array (a first front side optical element array) 3 for splitting a light beam from a light source into a plurality of partial light beams in a first section and for converging the respective partial light beams, a second cylindrical lens array (a first rear side optical element array) 4 located in the vicinity of converged positions of the plurality of the partial light beams and having a plurality of optical elements corresponding to the plurality of partial light beams, for leading the partial light beams to the surface to be illuminated such as a reflection type liquid display panel, a third cylindrical lens array (a second front side optical element array) 6 for splitting a light beam from the light source into a plurality of partial light beams in a second section and for converging the plurality of partial light beams, and a fourth cylindrical lens array (a second rear side optical element array) 7 located in the vicinity of converged positions of the plurality of the partial light beams and having a plurality of optical elements corresponding to the plurality of partial light beams, for leading the partial light beams onto the surface to be illuminated such as the reflection type liquid crystal panel, the width of the second optical element array (the first rear side optical element array) 4 in the first section (the distance from one end to the other end of cylindrical lenses belonging to the second cylindrical lens array, or the distance from the top position or the top surface of a cylindrical lens arranged nearest to one end side of the plurality of cylindrical lenses to the top position or the top surface of a cylindrical lens arranged nearest to the other end side) can be set to W1 while the width of the fourth cylindrical lens array (the second rear side optical element array) 7 in the second section (the distance from one end to the other end of the plurality of cylindrical lenses belonging to the fourth cylindrical lens array, or the distance from the top position or the top surface of a cylindrical lens arranged nearest to one end side of the plurality of cylindrical lenses to the top position or the top surface of a cylindrical lens arranged nearest to the other end side) can be set to W2, and then, a conditional formula as stated above can be set.

Further, the number of cylindrical lenses of the first and second cylindrical lens arrays arranged in the first section is larger than that of the third and forth cylindrical lens arrays in the second section. In at least one exemplary embodiment, the number of cylindrical lenses of the first and second cylindrical lens arrays is not less than 1.3 times (in yet another embodiment, not less than 1.6 times) but not greater than 3 times (in yet another embodiment 2.5 times or more, and in another embodiment 2 times) as large as large as that of the third and fourth cylindrical lens arrays.

Further, in the second section, since the beam diameter of the beam before being incident upon the panel is narrow (the angular distribution is narrow or the enlarging angle of each of the beams is small), the polarized beam splitter itself can be small-sized, thereby it is possible to contribute to miniaturization of the illumination optical system.

In this embodiment, although the afocal system 5 has a refractive power in the second section, the third and fourth cylindrical lens arrays 6, 7, the condenser lens 8 and the cylindrical lens array 9 are arranged on the rear side of the second cylindrical lens array (on the liquid crystal display side) 4, the present invention is not limited to this configuration. That is, the afocal system 5, the third and fourth cylindrical lens array, the cylindrical lens array 9 and the like (a part or all thereof) can be arranged on the front side of the second cylindrical lens array 4 (the first cylindrical lens array 3) (on the light source side). Specifically, if the first and second sections are independent from each other in view of their refractive powers so that no problem of physical interference is caused, they can be arranged in any configuration.

Further, there would be such a case that the polarization converting element (polarized beam splitter array) is arranged in the vicinity of the lens array in order to enhance the light available efficiency. Although it is not shown, it is desirable to arrange the polarization converting element on the rear side of the second cylindrical array 4 or on the rear side of the fourth cylindrical lens array 7. In particular, in the case of the arrangement on the rear side of the array 7, the element can be small-sized in comparison with a conventional one, and accordingly, there might be obtained such merits that the apparatus can be miniaturized and simplified, and the costs of the apparatus can be reduced as a whole.

With the configuration of this embodiment as stated above, an illumination optical system having two sections having different angular distributions can be materialized, and accordingly, even an optical system using an optical element which is sensitive to an angular characteristic can restrain deterioration of its performance. In particular, in a projector, it is possible to produce an image having a high contrast.

[Second Embodiment]

Figure 4A:
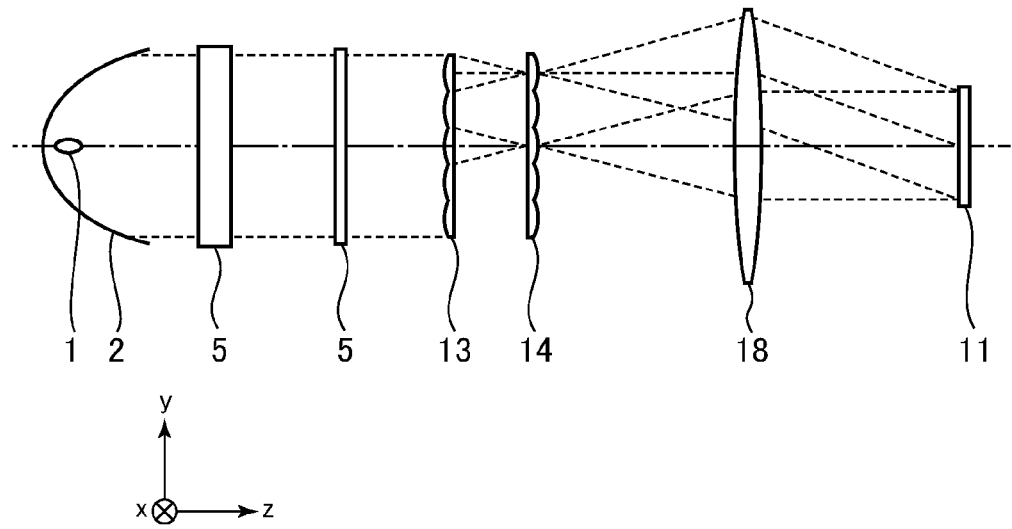
FIG. 4A is a sectional view illustrating an illumination optical system in a second embodiment of the present invention.
Figure 4B:
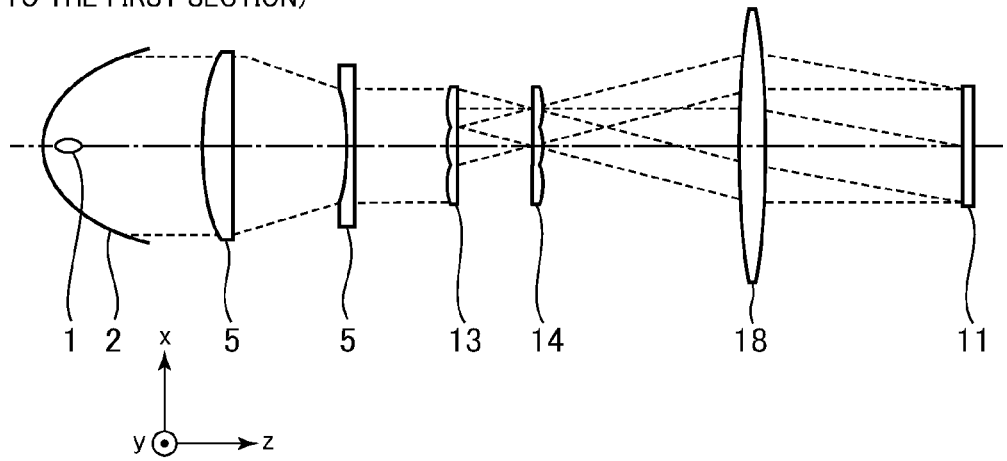
FIG. 4B is a sectional view illustrating the illumination optical system shown in FIG. 4A, in a second plane.

Referring to FIG. 4 which shows a second embodiment of the present invention, in this embodiment, the lens arrays are commonly used in both first and second sections. The lens arrays 13, 14 in this embodiment are so-called fly-eye lens arrays in which spherical lenses are two-dimensionally arranged.

Figure 7:
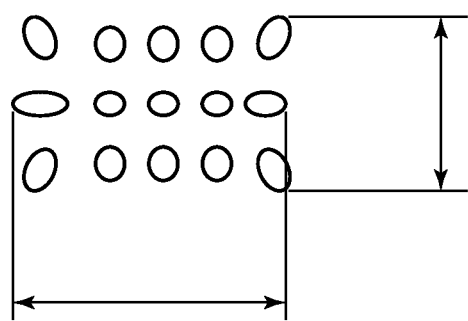
FIG. 7 is an image view illustrating an optical image according to the second embodiment of the present invention.
Figure 8:
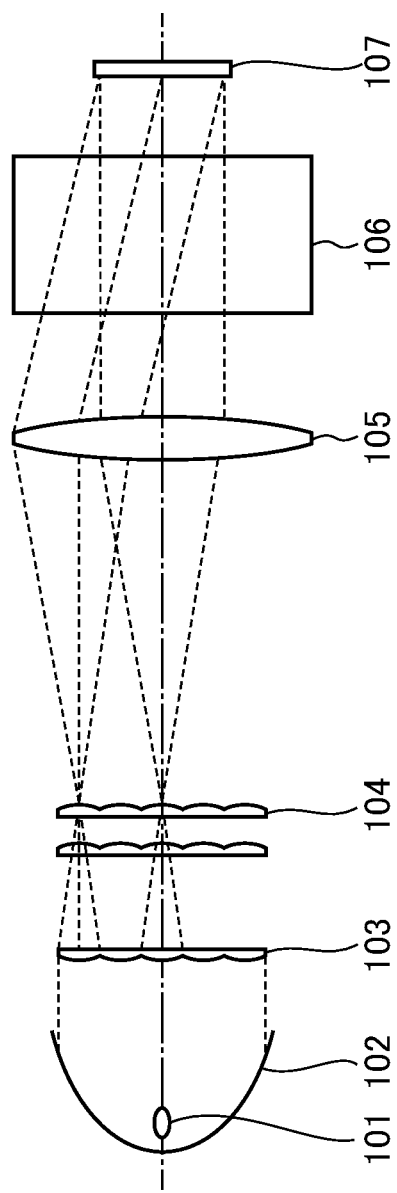
FIG. 8 is a sectional view illustrating the configuration of a conventional projector.

In the second section, an afocal system composed of concave and convex cylindrical lenses in combination carries out compression of an optical beam on the light source side of the lens arrays 13, 14. With this configuration, the lens arrays 13, 14 in this embodiment have sides having different lengths (the width of the incident light beam in the direction of the first section and the width thereof in the direction of the second section) between the first section and the second section, and the width in the first section (the length of the side in the direction of the first section) is greater than the width in the second section (the length of the side in the direction of the second section). The light beams split and converged by the lens array 13 constitute a group of light source images in the vicinity of the lens array 14. FIG. 7 shows an image of the group of light source images (an image in a plane perpendicular to the optical axis). The number of light source images is not, of course, limited to that shown in FIG. 7, but it is sufficient if any plural number of light source images are formed two dimensionally. It is noted here that the relationship between W1 and W2 as stated in the first embodiment is satisfied even as to the light source image forming zone in which these light source images are formed. Incidentally, the width W1 of the light source image forming zone in the first section is the maximum one of widths of the light source image forming zone which are obtained by cutting the light source image forming zone in which a plurality of light source images are formed (in at least one exemplary embodiment it can be the maximum one of distances from one endmost side part of the light source image at one endmost side among the plurality of light source images to the other endmost side part of the light source image at the other endmost side, distance from the gravitational center of brightness of the light source image at one endmost side to the gravitational center of brightness of the light source image at the other endmost side, or half-width values that is, distances between positions at which the brightness becomes half of the maximum brightness of the light source image at one end most side and a position at which the brightness becomes half to the maximum brightness of the light source image at the other endmost side), by a plurality of planes which are parallel with the first section (that is, in sections in parallel with the first section), and the width W2 in the second section is a distance similar to that as stated above. Thus, even in the second embodiment, W1 and W2 can be different from each other (asymmetric), and accordingly, technical effects similar to those in the first embodiment can be obtained. The configuration of the second embodiment is similar to that of the first embodiment, except that fly-eye lenses are used in order to commonly used optical members between the first (second) cylindrical lens array having refractive powers in the first section and the third (fourth) cylindrical array having refractive powers in the second section. With this configuration, the number of components can be reduced, thereby it is possible to obtain such technical effects that the configuration of the illumination optical system can be simplified, the yield can be enhanced and the costs can be reduced.

However, since the lens cells of the lens array 13 and the surface to be illuminated have a conjugate relationship therebetween, it is required that the shape of the lens cells follows the aspect ratio of the liquid crystal panel. Thus, in the case of the compression of the light beam in the second section, the shape of the lens cells cannot be itself narrowed, and accordingly, it is required to reduce the number of the lens cells in the second section. If the number of the lens cells is decreased, the effect of improvement in unevenness over the surface to be illuminated possibly becomes lower, resulting in limitation to the compression of the light beam, and therefore, the degree of freedom of design becomes less in comparison with that of the first embodiment. Thus, it is desirable that the configuration of the second embodiment satisfies the conditional formula as to W1 and W2. Further, it is desirable to arrange at least not less than three of lens cells having refractive powers in the second section, in the direction of the second section, and further, it is desirable to set the number of lens cells having refractive powers in the first section to a value which is not less than 1.3 times (in yet another embodiment not less than 1.6 times) but not greater than 3 times (or in yet another embodiment 2.5 times) as large as that of the lens cells having refractive powers in the direction of the second section.

Figure 6A:
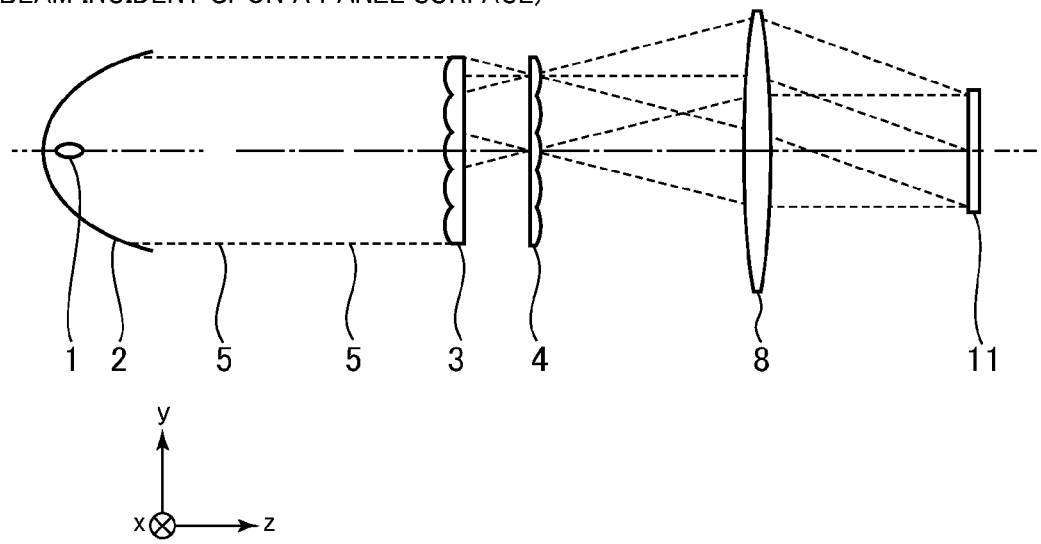
FIG. 6A is a sectional view illustrating an illumination optical system in a variant of the third embodiment of the present invention, in a first plane.
Figure 6B:
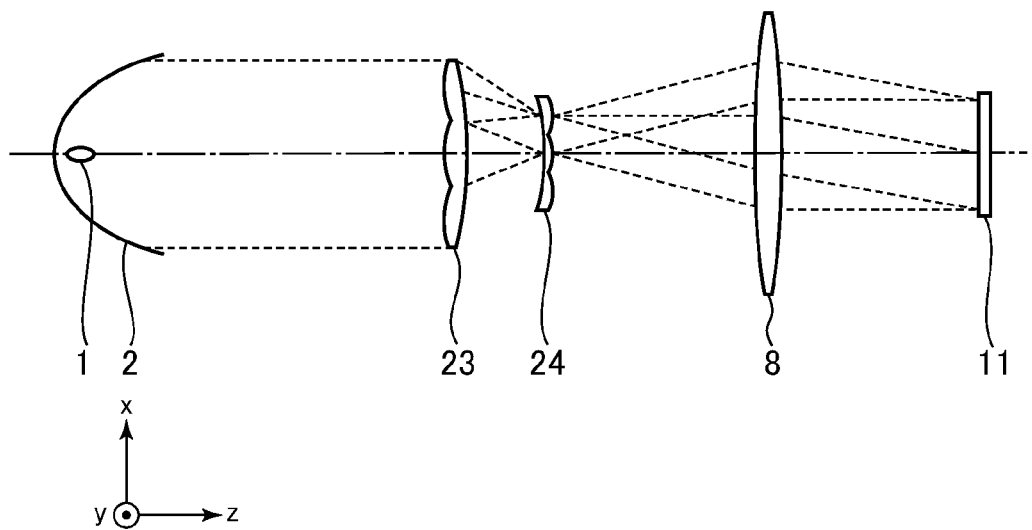
FIG. 6B is a sectional view illustrating the illumination optical system shown in FIG. 6A, in a second plane.

As a variant of this embodiment, the compression of the light beam can be made between the lens arrays 13, 14. Specifically, as shown in FIG. 6, there are provided a first optical element 23 formed on its one surface (the surface on the light source side) with a fly-eye lens surface and on its the other surface (the surface on the surface side to be illuminated) with a convex lens surface, and a second optical element 24 formed on its one surface (the surface on the light source side) with a concave lens surface and on its the other surface (the surface on the surface side to be illuminated) with a fly-eye lens surface. With this configuration, the number of components can be further decreased, thereby it is possible to provide a projectors having lower costs. In this configuration, the order of arrangement of the first optical element and the second optical element can be reversed. Further, the configuration of the afocal system is not limited to the combination of a convex lens surface and a concave lens surface, but the combination of a convex surface and a convex lens surface, of an elliptic reflection surface and a concave lens surface and so forth can also be used.

[Third Embodiment]

Figure 5:
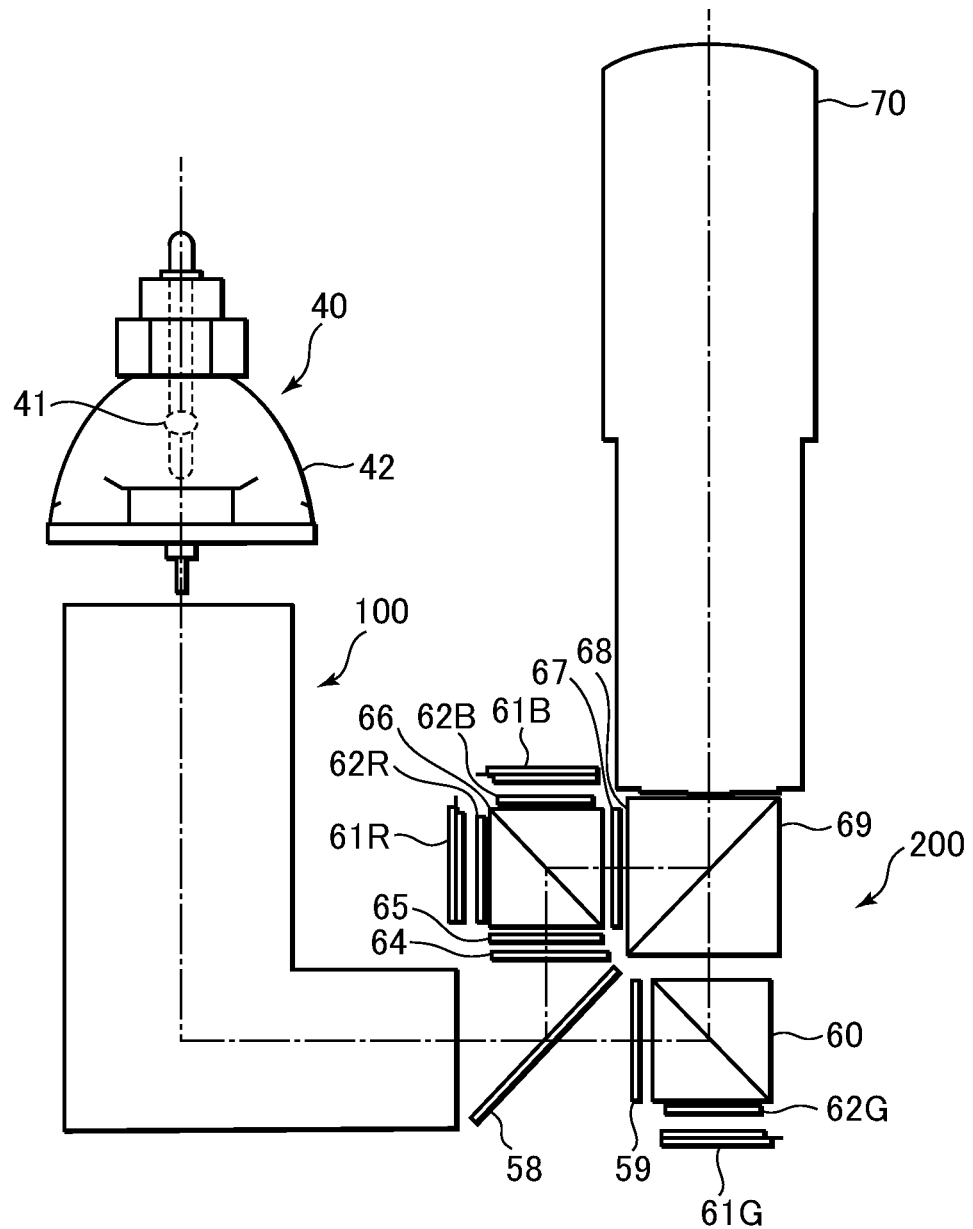
FIG. 5 is a view illustrating an image display apparatus (projector) in accordance with a third embodiment of the present invention.

Referring to FIG. 5 which is a view illustrating an image display apparatus (projector) composed of an illumination optical system 100 as stated in the above-mentioned first and second embodiments, there are shown a the light emitting bulb 41 for emitting white light with continuous spectrum, and a reflector 42 for converging light from the light emitting bulb 41 in a predetermined direction, both light emitting bulb 41 and the reflector 42 constituting a lamp 40. The light from the lamp 40 is led to a liquid crystal display element (a reflection type liquid crystal panel or the like) with the use of the illumination optical system 100 as stated in the above-mentioned first and second embodiments 1. Detailed description will be hereinbelow made.

Also referring to FIG. 5, there are shown a dichroic mirror 58 for reflecting light in wavelength ranges of blue (B) and red (R) but transmitting therethrough light in a wavelength range of green (G), the incident side polarizing plate 59 for G light, formed of a polarizer applied over a transparent substrate, which transmits only S-polarized light therethrough, and a first polarized beam splitter 60 having a polarization separation film, for transmitting therethrough P-polarized element but reflecting S-polarized light.

Further, there are shown a red light reflection type liquid crystal display element 61R, a blue light reflection type liquid crystal display element 61B and a green light reflection type liquid crystal display element 61G, for reflecting incident light and performing image modulation, a ¼ wavelength plate 62R for red light, a ¼ wavelength plate 62G for green light, a ¼ wavelength plate 62B for blue light, an incident side polarizing plate 64 for RB light, formed of a polarizer applied over a transparent substrate, which transmits therethrough only S-polarized light, a first color selective phase difference plate 65 which changes the polarizing direction of B light by an angle of 90 deg., but does not change the polarizing direction of R light, a second polarized beam splitter 66 having a polarization separation film, for transmitting therethrough P-polarized light but reflecting S-polarized light, and a second color selective phase difference plate 67 which changes the polarizing direction of R light by an angle of 90 deg., but does not change the polarizing direction of B light.

Further, there are shown an emergent side polarizing plate (polarizer) 68, for transmitting only S-polarized light, and a third polarized beam splitter 69 (color synthesizing device) having a polarization separation film, for transmitting therethough P-polarized light but reflecting S-polarized light. A color separation and synthesis optical system 200 is constituted by the components ranging from the dichroic mirror 58 to the third polarized beam splitter 69.

There is shown a projection lens optical system 70. The above-mentioned illumination optical system, the color separation and synthesis optical system and the projection lens optical system constitute an image display optical system.

Next, explanation will be made of optical action after light passes through the illumination optical system. At first, the G optical path will be explained.

G light which has passed through the dichroic mirror 58 is incident upon the incident side polarizing plate 59. The G light is still S-polarized light after the light is separated by the dichroic mirror 58. Further, after emerging from the incident side polarizing plate 59, the G light is incident as S-polarized light upon the first polarized beam splitter 60 and is reflected at the polarization separation film, and then comes to the G light reflection type liquid crystal display element 61G. In the G-light reflection type liquid crystal display element 91G, G-light is image-modulated and reflected. An S-polarized component of reflected light of the image-modulated G-light is again reflected at the polarization separation film of the first polarized beam splitter 60 and is returned to the light source side so as to be removed from the projection light. Meanwhile, a p-polarized component of the reflection light of the image-modulated G-light is transmitted through the polarization separation film of the first polarized beam splitter 60, and is directed as projection light to the third polarized beam splitter 69. At this time, in a condition in which all polarized components are changed into S-polarization (a condition in which black is displayed), the phase lag axis of the ¼ wavelength plate 62G arranged between the first polarized beam splitter 60 and the G-light reflection type liquid crystal display element 61G is adjusted to a predetermined direction so that affection by disturbance in a polarized condition, which occurs at the first polarized beam splitter 60 and the G-light reflection type liquid display element 61G can be held to a small value. G-light output from the first beam splitter 60 is incident upon the third polarized beam splitter 69 in a P-polarized state, then transmits through the polarization separation film in the third polarized beam splitter 69, and comes to the projection lens 70.

Meanwhile, R- and B-light reflected by the dichroic mirror 58 is incident upon the incident side polarizing plate 64. It is noted that the R- and B-light is still S-polarized even after they are separated from each other by the dichroic mirror 58. Further, the R- and B-light is output from the incident side polarizing plate 64, and is thereafter incident upon the first color selective phase difference plate 65. The first color selective phase difference plate 65 has such a function that only the polarizing direction of the B-light is rotated by an angle of 90 deg., and accordingly, the B-light which is P-polarized and the R-light which is S-polarized are incident upon the second polarized beam splitter 66. The R-light which is S-polarized and incident upon the second polarized beam splitter 66 is reflected by the polarization separation surface of the second polarized beam splitter 66, and then comes to the R-right reflection type liquid crystal display element 61R. Further, the B-right which is P-polarized and incident upon the second polarized beam splitter 66 is transmitted through the polarization separation surface of the second polarized beam splitter 66, and then comes to the B-light reflection type liquid crystal display element 61B.

The R-light incident upon the R-light reflection type liquid crystal display element 61R is image-modulated and reflected. The S-polarized component of the image-modulated and reflected R-light is transmitted again through the polarization separation surface of the second polarized beam splitter 66, and is then returned to the light source side so as to be removed from the projection light. Meanwhile, the P-polarized component of the image-modulated and reflected R-light is transmitted through the polarization separation surface of the second polarized beam splitter 66, and then is directed, as projection light, to the second color selective phase plate 67.

Further, the B-light incident upon the B-light reflection type liquid crystal display element 61B is image-modulated and reflected. The P-polarized component of the image-modulated and reflected B-light is again transmitted through the polarization separation surface of the second polarized beam splitter 66, and is then returned to the light source side so as to be removed from the projection light. Meanwhile, the S-polarized component of the image-modulated and reflected B-light is reflected by the polarization separation surface of the second polarized beam splitter 66, and is directed, as projection light, to the second color selective phase plate 67.

At this time, by adjusting the phase lag axes of the ¼ wavelength plates 62A, 62B provided between the second polarized beam splitter 66 and the R- and B-right reflection type liquid crystal display elements 62R, 62B, black display adjustment respective for the R- and B-light can be carried out, similar to the G-light.

Thus, the lights are synthesized into a single light beam, of the R-projection light and the B-projection light output from the second polarized beam splitter 66, the R-light is turned into an S-polarized component with its polarizing direction being rotated by an angle of 90 deg., by the second color selective phase plate 67, and is analyzed by the emergent side polarizing plate 68 before it is incident upon the third polarized beam splitter 69. Further, the B-light which is still in the S-polarized state as it is, is transmitted through the second color selective phase plate 67, and is then analyzed by the emergent side polarizing plate 68 before it is incident upon the third polarized beam splitter 69. It is noted that the R-projection light and B-projection light are analyzed by the emergent side polarizing plate 68 so as to be tuned into light from which ineffective components caused by passing the second polarized beam splitter 66 and the R- and B-light reflection type liquid crystal display elements 61R, 61B and the ¼ wavelength plates 62R, 62B are cut off.

Further, the R-projection light and the B-light which are incident upon the third polarized beam splitter 69 are reflected at the polarization separation surface of the third beam splitter 69, then is synthesized with G-light reflected from the above-mentioned polarization separation surface, and thereafter come to the projection lens 70.

Then, the synthesized R, G, B projection light is enlarged and projected onto the surface to be illuminated such as a screen, by the projection lens 70.

The optical path as stated above concerns such a case that the reflection type liquid crystal display elements exhibit white, and accordingly, explanation will be hereinbelow made of the optical path in such a case that the reflection type liquid crystal display elements exhibit black.

At first, explanation will be made of the G-light path.

The S-polarized component of G-light which has been transmitted through the dichroic mirror 58 is incident upon the incident side polarizing plate 59, then is incident upon the first polarized beam splitter 60 so as to be reflected by the polarization separation surface, and comes to the G-light reflection type liquid crystal display element 61G. However, since the reflection type liquid crystal display element 61G exhibits black, the G-light is reflected without being image-modulated. Thus, even after the reflection upon the reflection type liquid crystal display element 61G, the G-light is still S-polarized as it is, and accordingly, is again reflected by the polarization separation surface of the first polarized beam splitter 60. It is then transmitted through the incident side polarizing plate 59, and is returned to the light source side so as to be removed from the projection light.

Next, explanation will be made of optical paths for the R- and B-light.

S-polarized components of the R- and B-light reflected from the dichroic mirror 58, are incident upon the incident side polarizing plate 64. Thereafter they are output from the incident side polarizing plate 64 and are then incident upon the first color selective phase difference plate 65 which has a function of rotating the polarizing direction of the B-light alone by an angle of 90 deg., and accordingly, the B-light which is P-polarized and the R-light which is S-polarized are incident upon the second polarized beam splitter 66. Thus, the R-light which has been incident upon the second polarized beam splitter 66, being S-polarized, is reflected by the polarization separation surface of the second polarized beam splitter 66, and comes to the R-light reflection type liquid crystal display element 61R. Further, the B-light which has been incident upon the second polarized beam splitter 66, being P-polarized, is transmitted through the polarization separation surface of the second polarized beam splitter 66, and comes to the B-light reflection type liquid crystal display element 61B. Since the R-light reflection type liquid crystal display element 61R exhibits black, the B-light incident upon the R-light liquid crystal display element 61R is reflected without being image-modulated. Accordingly, even after the reflection by the R-light reflection type liquid display element 61R, the R-light is still S-polarized as it is, and accordingly, it is reflected at the polarization separation surface of the first polarized beam splitter 60, being then transmitted through the incident side polarizing plate 64 and returned to the light source side, and is removed from the projection light. Thus, black is displayed. Meanwhile, the B-light incident upon the B-light reflection type liquid crystal element 61B is reflected without being image-modulated since the B-light reflection type liquid crystal display element 6 exhibits black. Thus, since the B-light is still P-polarized as it is even after it is reflected by the B-light reflection type liquid crystal display element 61B, it is transmitted again through the polarization separation surface of the first polarized beam splitter 60, and is changed by the first color selective phase difference plate 65 into S-polarized light which is then transmitted through the incident side polarizing plate 64 so as to be returned to the light source surface, and is removed from the projection light.

Thus, the projection type image display apparatus using the reflection type liquid crystal display elements (reflection type liquid crystal panels) has the optical configuration as stated above.

In this third embodiment, although the color separation and synthesis system 200 is incorporated therein with the wavelength selective phase difference plate and the like, if the polarized beam splitter arranged in the color separation and synthesis system 200 has a polarization separation film which serves as a polarized beam splitter in a specified wavelength range within the visible range but which transmits or reflects light therethrough or thereupon in the other wavelength range, irrespective of the direction of polarization, it may be considered that the wavelength selective phase difference plate is not required. Further, a ¼ phase difference plate can be arranged between the color separation synthesis system 200 and the projection lens 70 in order to prevent light which is reflected at and returned from a lens surface in the projection lens 70, from being reflected back in the direction toward the screen (the direction toward the surface to be illuminated).

Further, in the third embodiment, although the explanation has been made of the presence of three liquid crystal display elements, the number of liquid crystal elements is not limited to three but can be 2 or 4. It can be, of course, 1.

As stated above, according to this embodiment, there can be provided an illumination optical system which has a high light available efficiency and which can illuminate the surface to be illuminated, substantially uniformly thereover, and also an image display apparatus using the illumination optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An illumination optical system for illuminating, with light from a light source, a surface to be illuminated via a polarization separation surface which is arranged at an inclination to an optical axis of the illumination optical system comprising, in order from the light source side:
a first front side cylindrical lens array;
a first rear side cylindrical lens array;
a second front side cylindrical lens array; and
a second rear side cylindrical lens array,
wherein when a section that is parallel with a normal line of the polarization separation surface and the optical axis of the illumination optical system is defined as a second section and a section that is perpendicular to the second section and parallel with the optical axis of the illumination optical system is defined as a first section,
the first front side cylindrical lens array has a plurality of cylindrical lenses having a refractive power in the first section,
the first rear side cylindrical lens array has a plurality of cylindrical lenses having a refractive power in the first section,
the second front side cylindrical lens array has a plurality of cylindrical lenses having a refractive power in the second section, and
the second rear side cylindrical lens array has a plurality of cylindrical lenses having a refractive power in the second section, and
wherein a light beam diameter in the first section of an incident light to the first rear side cylindrical lens is larger than a light beam diameter in the second section of an incident light to the second rear side cylindrical lens.

2. An image display apparatus comprising:
at least one liquid crystal display element; and
an illumination optical system for illuminating, with light from a light source, a surface to be illuminated via a polarization separation surface which is arranged at an inclination to an optical axis of the illumination optical system comprising, in order from the light source side:
a first front side cylindrical lens array;
a first rear side cylindrical lens array;
a second front side cylindrical lens array; and
a second rear side cylindrical lens array,
wherein when a section that is parallel with a normal line of the polarization separation surface and the optical axis of the illumination optical system is defined as a second section and a section that is perpendicular to the second section and parallel with the optical axis of the illumination optical system is defined as a first section,
the first front side cylindrical lens array has a plurality of cylindrical lenses having a refractive power in the first section,
the first rear side cylindrical lens array has a plurality of cylindrical lenses having a refractive power in the first section,
the second front side cylindrical lens array has a plurality of cylindrical lenses having a refractive power in the second section, and
the second rear side cylindrical lens array has a plurality of cylindrical lenses having a refractive power in the second section, and
wherein a light beam diameter in the first section of an incident light to the first rear side cylindrical lens is larger than a light beam diameter in the second section of an incident light to the second rear side cylindrical lens, the illumination optical system for illuminating said at least one liquid crystal display element with light from the light source.

3. An illumination optical system for illuminating a surface to be illuminated comprising:
a light source image forming unit having a pair of fly-eye lens arrays configured to split a light beam from a light source in a first section which is parallel to an optical axis of the illumination optical system and form a plurality of first light source images in a first light source image zone with the use of the split light beams, and split the light beam from the light source in a second section which is parallel to the optical axis of the illumination optical system and which is perpendicular to the first section and form a plurality of second light source images in a second light source image zone with the use of the split light beams; and an afocal optical system located closer to the light source than the first or second light source image zone, and configured to enlarge a light width of the light beam from the light source, wherein the width of the first light source image zone in the first section is larger than the width of the second light source image zone in the second section.

4. An illumination optical system according to claim 3, wherein the afocal optical system comprises the light source image forming unit.

5. An illumination optical system according to claim 3, further comprising:

an optical element located closer to the surface to be illuminated than the afocal optical system, and has a characteristic that an angular sensitivity in the second section is higher than that in the first section.

6. An image display apparatus comprising:

at least one liquid crystal display element; and an illumination optical system for illuminating a surface to be illuminated comprising:

a light source image forming unit having a pair of fly-eye lens arrays configured to split a light beam from a light source in a first section which is parallel to an optical axis of the illumination optical system and form a plurality of first light source images in a first light source image zone with the use of the split light beams, and split the light beam from the light source in a second section which is parallel to the optical axis of the illumination optical system and which is perpendicular to the first section and form a plurality of second light source images in a second light source image zone with the use of the split light beams; and an afocal optical system located closer to the light source than the first or second light source image zone, and configured to enlarge a light width of the light beam from the light source, wherein the width of the first light source image zone in the first section is larger than the width of the second light source image zone in the second section, the illumination optical system for illuminating said at least one liquid crystal display element with light from the light source.

* * * * *